Oct. 21, 1924. 1,512,566
O. M. TUCKER ET AL
METHOD AND APPARATUS FOR DELIVERING VISCOUS GLASS
Filed Aug. 12, 1918

Oliver M. Tucker
William A. Reeves
INVENTOR.

BY Edwin P. Corbett
ATTORNEY.

Patented Oct. 21, 1924.

1,512,566

UNITED STATES PATENT OFFICE.

OLIVER M. TUCKER AND WILLIAM A. REEVES, OF COLUMBUS, OHIO.

METHOD AND APPARATUS FOR DELIVERING VISCOUS GLASS.

Application filed August 12, 1918. Serial No. 249,421.

*To all whom it may concern:*

Be it known that we, OLIVER M. TUCKER and WILLIAM A. REEVES, citizens of the United States of America, residing at Columbus, in the county of Franklin and State of Ohio, have invented certain new and useful Improvements in a Method and Apparatus for Delivering Viscous Glass, of which the following is a specification.

Our invention relates to a method and apparatus for delivering viscous glass. It has particular reference to such a spout in connection with a glass furnace, being primarily designed to meet certain requirements in the production of en bloc charges preformed as to shape and dimensions and the dropping and settling of such charges right side up in the molds where they are to be further treated.

Others have devised spouts which deliver viscous glass from furnace to mold and others have provided means for heating the glass in such spouts. But, the production of preformed charges and the proper deposit thereof calls for certain accuracies that are only attainable by special measures of control. For instance, glass being delivered through a spout is very liable to develop strata of different temperatures and, if this condition exists in the glass being actually delivered from the delivery orifice of the spout, the charges will frequently curve, because one side is colder than the other or will be otherwise of uneven consistency. Then, the curved charges will not properly settle in their molds while the uneven consistency will prevent proper subsequent treatement, as by blowing thin, et cetera. These are merely examples of numerous defects due to improper temperature control. We have solved a very bothersome problem by first providing a spout which is thoroughly insulated and then equipping such spout with means whereby the temperature of both the spout interior and the glass can be efficiently regulated.

Thus, regardless of variations in furnace conditions, we have devised apparatus making it possible to deliver charges of viscous glass of chosen quantity, quality and uniformity. In this way, we have taken the handling of glass one step further away from formerly existing limitations inherent in the problem of extracting viscous glass from furnaces whose internal conditions are inevitably ever-changing.

The preferred embodiment of our invention is shown in the accompanying drawings wherein.

The top, bottom, sides and ends of the spout 1 are thoroughly insulated as at 4.

We have provided several means, additional to the insulation, for controlling the internal temperature of the spout and the temperature of the glass at different points in such spout. In the first place, both the channel and the hood of the spout are enlarged at their receiving end, as at 5. This facilitates inlet of the glass and the heat currents from the glass furnace. More important, still, the wide channel for the glass results in slow movement of the glass at this point and it will appear that we utilize this condition for temperature regulation before the glass passes into the heavily insulated narrow channel. Thus, before the glass reaches the delivery orifice where it has a more rapid movement, it has ample time for the heated and chilled strata to diffuse and bring about the delivery of charges of any desired uniform temperature and consistency. From its wide portion, the spout tapers toward its delivery end where it is provided with a valve-controlled draft flue 6 lined with refractory and insulating material and leading out of the top of the spout nose to assist in drawing the heat currents from the furnace through the spout, above and in direct contact with the glass in such spout. Thus the glass passes through the spout with a minimum amount of wall-friction and the heat currents are readily controlled.

Figure 1:
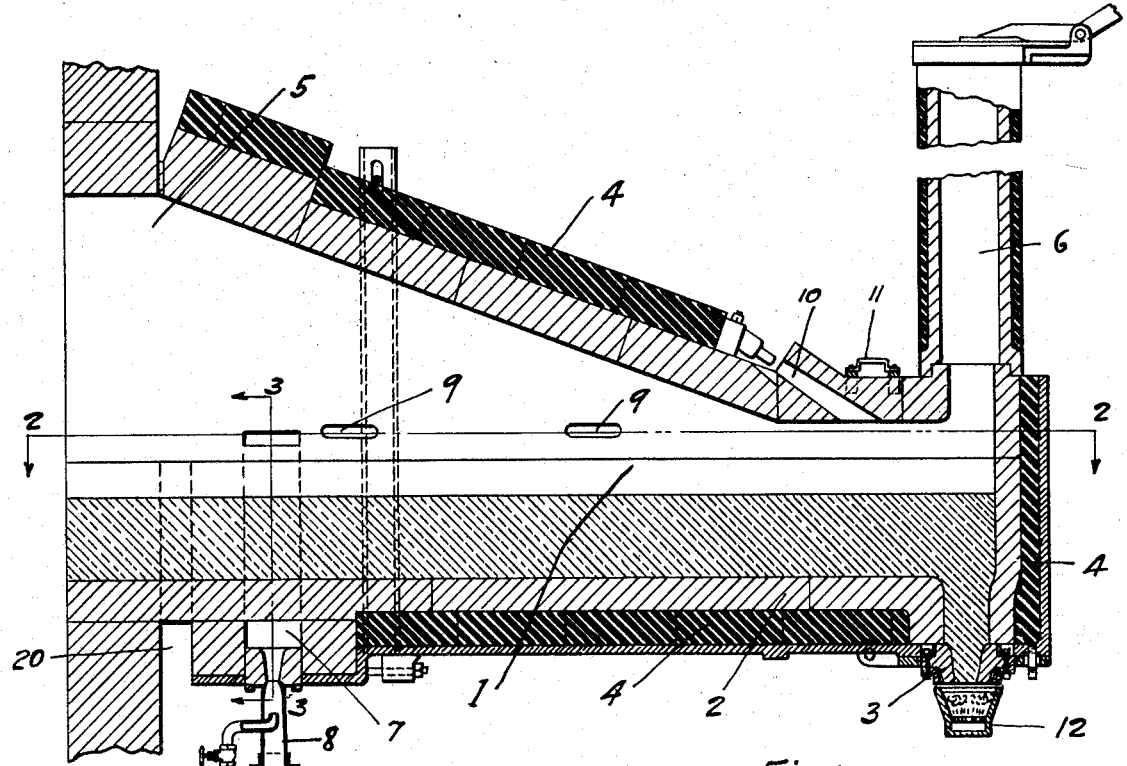
Figure 1 is a longitudinal section of our spout structure, shown applied to a furnace.
Figure 2:
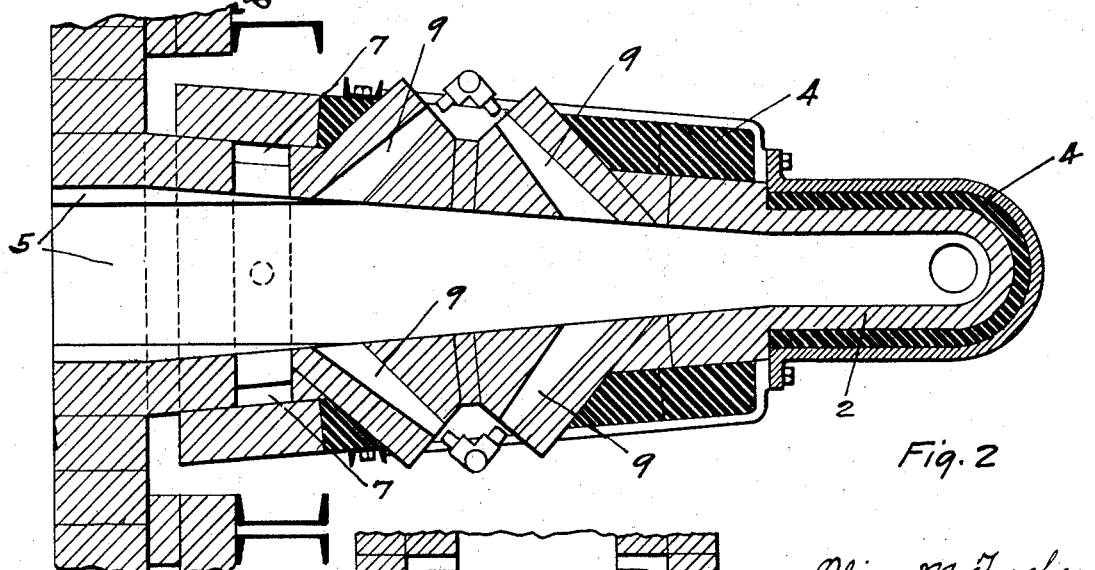
Figure 2 is a section taken on line 2—2 of Figure 1.
Figure 3:
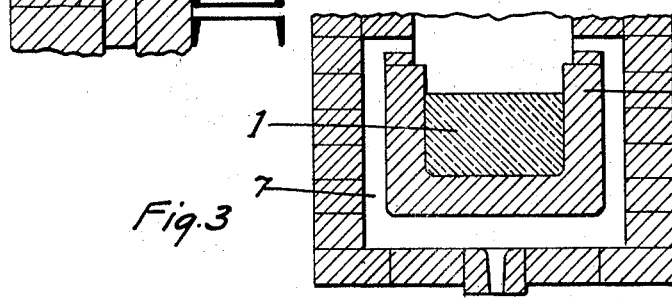
Figure 3 is a partial section, taken on the line 3—3 of Figure 1.

The walls of the spout are provided with a channel which is shown at 7 as extending around three sides of the spout adjacent the juncture of the spout with the furnace and which may be fed with a heating or cooling fluid from below as at 8. In the form shown these channels deliver into the space 5 (Figure 1) and the heating or cooling fluid, preferably a gas, may be so delivered as to commingle with the heat currents from the furnace so as to directly modify the effect of such currents upon the glass and wall surfaces and, in time, to modify the effect of the wall surfaces upon the glass. It will be obvious that the channel 7 may be ramified to various points in the walls of the spout. However, it is an important fact of our invention that we positively influence the temperature of the glass very near the moment when it enters the spout, thereby giving ample opportunity for diffusion of the impressed temperature during the time the glass travels to the delivery orifice.

It is likewise of considerable importance that the outer lining around the channel blocks 2 is spaced from the furnace wall as at 20. This is an important structural feature, due to the fact that there is a tendency for the glass in the furnace to destructively erode and seep through the joints between an insulated furnace wall and the channel blocks. If the channel 7 abutted the furnace wall this tendency would eventually result in filling up the channel 7 with glass and thus rendering it inoperative. But with the space 20, the outer surfaces of the furnace wall and the joints at the points in question are chilled by the atmosphere sufficiently to prevent destructive erosion of the wall blocks and leakage and, even if any slight leakage occurs, the glass will merely drip down onto the floor, since it cannot reach the channel 7.

In addition the spout is provided in its walls, with ports 9 that are preferably oblique and which are so located as to make possible the direct application of heating or cooling blasts to any area above the upper surface of the glass in the spout. Furthermore, there is provided a port 10 in the top of a lid 11 of the spout nose, this port permitting the application of either a heating or cooling blast within such nose and adjacent the delivery orifice. The lid is particularly desirable because it is removable to give ready access to the glass in the spout.

Thus, the temperature of the glass and spout walls at every point is under positive control and this control is so complete that the glass may be brought to the delivery orifice at any desired uniform consistency and at any rate of movement within chosen limits.

In addition, we have a means for intermittently stopping feed of the glass from the delivery orifice of the spout, which means takes the form of a cup 12 movable into and out of closing relation to the bottom end of the spout orifice. When in position, gas under pressure is fed to the cup and burned therein while the cup is closed with the exception of an extremely small outlet for the products of combustion, so that an intense heat is applied to the clay bushing 3.

From this it will be seen that the glass in the spout is subject to complete temperature control, from the moment it enters until it leaves the spout. In our method, these temperature controls are desirably utilized to insure a uniform temperature and rate of movement at the delivery orifice. A large part of the uniformity of temperature and rate of movement is attributable to the insulation upon the spout, for it greatly enhances surety of control, although the various features of control are all important.

Having thus described our invention, what we claim is:

1. The method of delivering glass from a source of supply through a spout which comprises flowing a temperature modifying medium around and in contact with the walls of said spout, and then delivering such fluid into the spout interior above the glass line.

2. A spout for delivering viscous glass from a furnace comprising a body portion, a substantially vertical channel in the wall of said body portion, and means for circulating either a heating or cooling medium through said channel into the spout.

3. A spout for delivering viscous glass from a furnace comprising a body portion with a delivery aperture therein, and a channel in the wall of said body portion for the circulation of a temperature influencing medium, said channel emptying such medium into the space above the glass in said spout.

4. A spout for delivering viscous glass from a furnace comprising a body portion with a delivery aperture therein, and a channel extending around said spout adjacent the juncture and emptying into said spout above the glass line.

5. A spout for delivering viscous glass from a furnace comprising a body portion with a delivery aperture therein, and ports for the introduction of a temperature controlling medium, said ports being directed both inwardly toward the furnace, and outwardly toward the outer end of said spout.

6. A spout for delivering viscous glass from a furnace comprising a body portion with a delivery aperture therein, a channel around said spout, a valve controlled chimney on said portion, a burner playing upon the glass adjacent said aperture, and ports directed inwardly and outwardly along said spout.

7. In a spout for feeding viscous glass from a furnace and having a discharge outlet therein, side walls, a substantially vertical conduit in each side wall for delivering a temperature modifying medium to the interior of the spout above the glass level, and means for supplying such temperature modifying medium to said conduits.

8. In a spout for feeding viscous glass from a furnace and having a discharge outlet therein, side walls, a substantially vertical conduit in each side wall adjacent the juncture of the furnace and the spout for delivering a temperature modifying medium to the interior of the spout above the glass level, and means for supplying such temperature modifying medium to said conduits.

9. In spout structure for delivering viscous glass, a glass trough, a U-shaped channel member for the reception of a temperature modifying medium, the vertical legs of said U-shaped channel member extending upwardly through the vertical side walls of said spout and passing through the sides of the spout above the glass line for the delivery of said medium into the spout above the glass.

10. In spout structure for delivering viscous glass the combination of a glass trough with a delivery opening therein, and channels extending upwardly through the spout walls adjacent the juncture of the spout with the furnace and opening into the interior of the spout above the glass line for the reception of a temperature modifying medium and the delivery of such medium into the interior of the spout above the glass.

11. In spout structure for delivering viscous glass the combination of a glass trough with a delivery opening therein, and channels extending upwardly through the spout walls adjacent the juncture of the spout with the furnace and opening into the interior of the spout above the glass line for the reception of a temperature modifying medium and the delivery of such medium into the interior of the spout above the glass, and means for introducing either a heating or a cooling fluid into said channels.

12. In a spout for delivering viscous glass from a furnace, a channel in the wall of the spout for delivering a temperature modifying fluid into the interior of said spout above the glass line, said channel directing the fluid first in one direction and then in another.

In testimony whereof we hereby affix our signatures.

OLIVER M. TUCKER.
WILLIAM A. REEVES.